No. 742,961. PATENTED NOV. 3, 1903.
A. G. BOONE.
COOKING UTENSIL.
APPLICATION FILED NOV. 15, 1902.
NO MODEL.
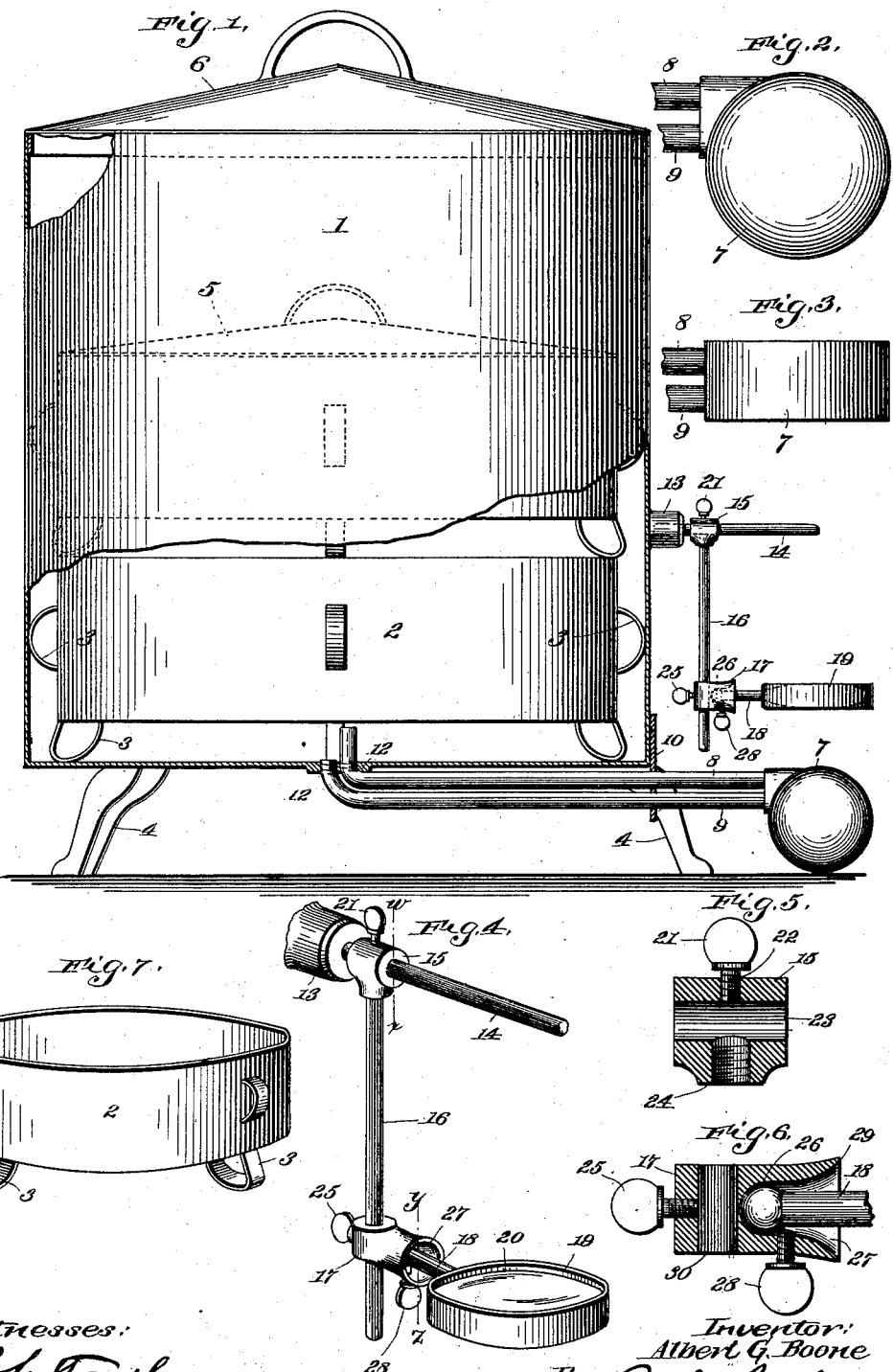
Witnesses:
Inventor:
Albert G. Boone
By Royal E. Burnham,
Atty.

No. 742,961. Patented November 3, 1903.

UNITED STATES PATENT OFFICE.

ALBERT G. BOONE, OF DETROIT, MICHIGAN.

COOKING UTENSIL.

SPECIFICATION forming part of Letters Patent No. 742,961, dated November 3, 1903.

Application filed November 15, 1902. Serial No. 131,513. (No model.)

*To all whom it may concern:*

Be it known that I, ALBERT G. BOONE, a citizen of the United States, residing at Detroit, in the county of Wayne and State of Michigan, have invented certain new and useful Improvements in Cooking Utensils; and I do hereby declare the following to be a full, clear, and exact description of the invention, such as will enable others skilled in the art to which it appertains to make and use the same.

This invention relates to cooking utensils, and especially to those utensils wherein water or other liquid is heated for the purpose of properly heating the matter placed therein.

One object of the invention is to provide a utensil of this character in which either the rays of the sun or artificial heat may be employed for cooking purposes, and which at the same time will be simple, inexpensive, and efficient.

Another object is to provide the utensil with a heat-receiving portion of such construction that satisfactory results can be obtained no matter at what angle the rays of the sun or the artificial heat are directed against it.

Another object is to provide means for readily disconnecting the heat-receiving portion from the body of the cooker.

Another object is to provide novel connection between the cooker proper and the heat-receiving portion.

Another object is to provide means for readily and properly adjusting and focusing the lens which causes rays of the sun to converge upon the heating-surface.

Still another object is to provide the cooker proper with novel and handy receptacles for the articles to be cooked.

Novel details in the arrangement and construction of the several parts of the cooker will be apparent from the detail description hereinafter when read in connection with the accompanying drawings, forming part hereof, and the appended claims.

In the said drawings a preferable embodiment of the invention is delineated for purposes of illustration, and when referring to the same like reference characters will refer to corresponding parts in the several views, of which—

Figure 1 is a view of the entire utensil, showing the heating portion, connecting-pipes, and lens supporting and adjusting means, the boiler portion being broken away to show the inner receptacles thereof and also the manner of entrance of the pipes. Fig. 2 is a detail view of the globular form of the heating portion. Fig. 3 is a detail view of the disk form of the heating portion. Fig. 4 is a detail view of the means for supporting and adjusting the lens. Fig. 5 is a detail sectional view on the line $w\ x$, Fig. 4, of the upper lens-adjusting collar. Fig. 6 is a detail sectional view on the line $y\ z$, Fig. 4, of the lower lens-adjusting collar; and Fig. 7 is a perspective view of an inner receptacle of the cooker.

Referring more particularly to the drawings, 1 designates the main or boiler portion of the utensil, wherein the matter to be heated or cooked is either placed in mass or in one or more pans 2, seated on and held in position by curved legs 3. The entire apparatus is supported on legs 4. The pans are of the same general contour as the boiler, and the legs 3 are so fitted that the pans may be set snugly in the boiler one above the other, and so that steam and heat may pass on all sides of them. The pans may or may not, as desired, be provided with covers 5, and the boiler is provided with a cover 6.

The heater 7 is connected to, communicates with the boiler through, and is supported by, the upper pipe 8 and the lower pipe 9. The pipes are supported by the depending rack 10, and they extend laterally from the boiler in either a horizontal or slanting position. They enter at some lower part of the boiler, preferably through the bottom. The pipe 9 terminates at its point of entrance into the boiler and pipe 8 extends upward a short distance into the boiler for purposes hereinafter to be explained, and they are so fastened into the boiler as to make a water-tight connection. The pipes 8 and 9 may be fitted with screw-threaded collar-joints 12 and 12, respectively, in order that the heater may be easily disconnected from the boiler for emptying and cleaning purposes.

The pipes 8 and 9 are of such length as to support the heater 7 beyond the main portion of the utensil in order that rays of the sun or artificial heat may with facility be directed against the heater. The heater may be either of globular form, as shown in Fig. 2, or of disk form, as shown in Fig. 3, and it is made of some suitable material, such as copper. Pipe 8 leads into the upper portion of the heater, so that air may readily pass out when the apparatus is filled and that hot water and steam may pass therefrom into the boiler or cooker, and pipe 9 leads into the heater at a point below pipe 8. The pipes are fastened to the heater so as to make water-tight connections.

A hub 13 is fastened to the shell of the cooker some distance above the bottom of the cooker and on the same side as the heater. This hub is connected to and serves as a support for the laterally-extending rod 14, upon which the collar 15 is held laterally and revolubly adjustable. The collar 15 has connected to it and supports the depending rod 16, and upon the rod 16 is the collar 17, adjustable longitudinally and revolubly thereon. A rod 18, which is rigidly connected to and serves as a support for the frame 19 of the lens 20, is adjustably connected to and supported by the collar 17. The rods 14 and 16 are preferably screw-threaded into the hub 13 and the collar 15, respectively.

The collar 15 is held in any desired position on the rod 14 by the lock-screw 21, which is operative in the screw-threaded aperture 22. The rod 14 operates through the channel 23. The rod 16 is held in the screw-threaded opening 24.

The lock-screw 25 locks the collar 17 in any desired position on the rod 16. The rod 18 is adjustably connected in the collar 17 by means of a ball-and-socket joint, the rod 18 terminating in the ball 26, which is seated in the socket 27 and which is held in any desired position by the lock-screw 28. The opening 29, leading from the ball-and-socket joint, is of flaring conical shape to permit of free sweep of the rod 18. The rod 16 operates through the channel 30 of the collar 17.

In operation a suitable quantity of water is placed in the boiler 1, the heater 7 and the pipes 8 and 9 at the same time being filled. As one of the pipes extends to a higher point within the boiler than the other the passage of air from the heater and pipes is readily permitted. The matter to be cooked or heated is either placed directly into the boiler or into the pans 2, which may be set within the boiler.

When the conditions of the weather are such that the rays of the sun are available, such rays are directed and focused upon the heater 7 by the lens 20, which is adjustable in all directions upon its supporting means, and the water within the heater 7, and thereby the water and material in the boiler 1, is heated to the desired temperature.

When it is not practicable to use rays of the sun for heating purposes, artificial heat may readily be used. A gas-stove, a gas or oil burner, or the like may easily be placed in position under the heater 7 in order to secure the desired results.

When the globular form of heater is used, rays of the sun will strike directly against the surface thereof at no matter what angle to the horizontal the rays may be received, so that good results may be obtained in the morning and afternoon as well as at midday.

The globular form of heater also makes it practicable to direct the flames of several Bunsen or similar burners against it.

Having thus fully described my invention, what I claim as new, and desire to secure by Letters Patent, is—

1. A cooker comprising a main portion; a smaller hollow globular portion, against which heat may be directed; laterally-extending pipes communicating between the main and smaller portions and supporting the smaller portion; and means for directing and converging rays of the sun upon the smaller portion, said means comprising a hub fastened to the main portion and supporting a laterally-extending arm, an adjustable depending arm supported by the laterally-extending arm and a lens held by an arm adjustably supported by the depending arm, substantially as described.

2. A cooker comprising a main portion; a smaller hollow globular portion, against which heat may be directed; laterally-extending pipes communicating between the main and smaller portions and supporting the smaller portion; and means for directing and converging rays of the sun upon the smaller portion, said means comprising a hub fastened to the main portion, a laterally-extending arm supported by the hub, a collar traveling and adjustable on said extending arm, a depending arm supported by said collar on the extending arm, a collar traveling and adjustable on the depending arm, and a lens supported by an arm adjustably connected in the last-mentioned collar, substantially as described.

3. A cooker comprising a main portion; a smaller hollow globular portion, against which heat may be directed; laterally-extending pipes communicating between the main and smaller portions and supporting the smaller portion; and means for directing and converging rays of the sun upon the smaller portion, said means comprising a hub fastened to the main portion, a laterally-extending arm supported by the hub, a collar traveling and adjustable on said extending arm, a depending arm supported by said collar on the extending arm, a collar traveling and adjustable on the depending arm, and a lens supported by an arm adjustably connected in the last-mentioned collar by a ball-and-socket joint, substantially as described.

4. A cooker comprising a main portion; a smaller hollow portion, against which heat may be directed; laterally-extending pipes communicating between the main and smaller portions and supporting the smaller portion;

and means for directing and converging rays of the sun upon the smaller portion, said means comprising a hub fastened to the main portion and supporting a laterally-extending arm, an adjustable depending arm supported by the laterally-extending arm and a lens held by an arm adjustably supported by the depending arm, substantially as described.

5. A cooker comprising a main portion; a smaller hollow portion, against which heat may be directed; laterally-extending pipes communicating between the main and smaller portions and supporting the smaller portion; and means for directing and converging rays of the sun upon the smaller portion, said means comprising a hub fastened to the main portion, a laterally-extending arm supported by the hub, a collar traveling and adjustable on said extending arm, a depending arm supported by said collar on the extending arm, a collar traveling and adjustable on the depending arm, and a lens supported by an arm adjustably connected in the last-mentioned collar, substantially as described.

6. A cooker comprising a main portion; a smaller hollow portion, against which heat may be directed; laterally-extending pipes communicating between the main and smaller portions and supporting the smaller portion; and means for directing and converging rays of the sun upon the smaller portion, said means comprising a hub fastened to the main portion, a laterally-extended arm supported by the hub, a collar traveling and adjustable on said extending arm, a depending arm supported by said collar on the extending arm, a collar traveling and adjustable on the depending arm, and a lens supported by an arm adjustably connected in the last-mentioned collar by a ball-and-socket joint, substantially as described.

7. In combination with a receptacle, means for directing and converging rays of the sun thereon comprising a laterally-extending arm, an adjustable depending arm supported by the laterally-extending arm and a lens held by an arm adjustably supported by the depending arm, substantially as described.

8. In combination with a receptacle, means for directing and converging rays of the sun thereon comprising a laterally-extending arm, a collar traveling and adjustable on said extending arm, a depending arm supported by said collar on the extending arm, a collar traveling and adjustable on the depending arm, and a lens supported by an arm adjustably connected in the last-mentioned collar, substantially as described.

9. In combination with a receptacle, means for directing and converging rays of the sun thereon comprising a laterally-extending arm, a collar traveling and adjustable on said extending arm, a depending arm supported by said collar on the extending arm, a collar traveling and adjustable on the depending arm, and a lens supported by an arm adjustably connected in the last-mentioned collar by a ball-and-socket joint, substantially as described.

In testimony whereof I affix my signature in presence of two witnesses.

ALBERT G. BOONE.

Witnesses:
WM. G. GRIFFITHS,
HARVEY F. BELANGER.